(12) United States Patent
Lin et al.

(10) Patent No.: US 9,950,952 B2
(45) Date of Patent: Apr. 24, 2018

(54) METHODS FOR SERVICING SUBTERRANEAN WELLS

(75) Inventors: Lijun Lin, Sugar Land, TX (US);
Philip F. Sullivan, Bellaire, TX (US);
Gary John Tustin, Cambridgeshire (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 334 days.

(21) Appl. No.: 13/603,367

(22) Filed: Sep. 4, 2012

(65) Prior Publication Data

US 2013/0233551 A1   Sep. 12, 2013

Related U.S. Application Data

(63) Continuation-in-part of application No. 13/301,240, filed on Nov. 21, 2011.
(Continued)

(51) Int. Cl.
| | |
|---|---|
| C04B 7/02 | (2006.01) |
| C04B 7/00 | (2006.01) |
| C04B 24/26 | (2006.01) |
| C04B 28/02 | (2006.01) |
| C09K 8/42 | (2006.01) |
| C09K 8/467 | (2006.01) |
| E21B 33/13 | (2006.01) |
| C04B 111/00 | (2006.01) |

(52) U.S. Cl.
CPC ............ *C04B 7/00* (2013.01); *C04B 24/2652* (2013.01); *C04B 28/02* (2013.01); *C09K 8/428* (2013.01); *C09K 8/467* (2013.01); *C04B 2111/00663* (2013.01); *E21B 33/13* (2013.01)

(58) Field of Classification Search
CPC .................................. C04B 7/02; C04B 26/20
See application file for complete search history.

(56) References Cited

U.S. PATENT DOCUMENTS 3,288,720 A   11/1966   Giorgio et al.
3,447,608 A   6/1969   Fry et al.
(Continued)

FOREIGN PATENT DOCUMENTS

DE   3629769     3/1987
EP   0566028 A1  10/1993
(Continued)

OTHER PUBLICATIONS

Aften C: "Study of Friction Reducers for Recycled Stimulation Fluids in Environmentally Sensitive Regions," paper SPE 138984 presented at SPE Eastern Regional Meeting held in Morgantown, West Virginia, Oct. 12-14, 2010.
(Continued)

*Primary Examiner* — William D Hutton, Jr.
*Assistant Examiner* — Ashish K Varma
(74) *Attorney, Agent, or Firm* — Andrea E. Tran

(57) ABSTRACT

Pumpable process-fluid compositions and methods for establishing hydraulic isolation in cemented subterranean wells comprise more than 1 wt % polyacrylamide and a non-metallic crosslinker. Upon entering voids and cracks in or adjacent to a cement sheath, and contacting the set-cement surfaces, the compositions react and form a seal that prevents further leakage.

20 Claims, 1 Drawing Sheet

Related U.S. Application Data

(60) Provisional application No. 61/418,211, filed on Nov. 30, 2010.

(56) References Cited

U.S. PATENT DOCUMENTS

| | | | |
|---|---|---|---|
| 3,483,706 A | 12/1969 | Taradash et al. | |
| 3,488,720 A | 1/1970 | Coscia et al. | |
| 3,504,499 A | 4/1970 | Taradash et al. | |
| 3,507,847 A | 4/1970 | Coscia et al. | |
| 3,776,310 A | 12/1973 | Norton et al. | |
| 3,779,914 A * | 12/1973 | Nimerick | C09K 8/88 166/283 |
| 4,069,161 A | 1/1978 | Pogers | |
| 4,101,501 A | 7/1978 | Hinterwalder | |
| 4,137,970 A | 2/1979 | Laflin et al. | |
| 4,183,406 A | 1/1980 | Lundberg et al. | |
| 4,246,124 A | 1/1981 | Swanson | |
| 4,258,790 A * | 3/1981 | Hale | C04B 28/02 166/283 |
| 4,277,580 A * | 7/1981 | Allen | C09K 8/74 507/226 |
| 4,385,935 A | 5/1983 | Skjeldal | |
| 4,391,925 A | 7/1983 | Mintz et al. | |
| 4,441,556 A | 4/1984 | Powers et al. | |
| 4,460,751 A | 7/1984 | Hanlon et al. | |
| 4,461,352 A | 7/1984 | Falk | |
| 4,509,985 A | 4/1985 | Davidovits et al. | |
| 4,521,452 A | 6/1985 | Highsmith | |
| 4,613,631 A | 9/1986 | Espenscheid et al. | |
| 4,643,255 A | 2/1987 | Sandiford et al. | |
| 4,663,366 A | 5/1987 | Drake et al. | |
| 4,773,481 A | 9/1988 | Allison et al. | |
| 4,836,940 A | 6/1989 | Alexander | |
| 4,859,367 A | 8/1989 | Davidovits | |
| 4,898,242 A | 2/1990 | Jennings, Jr. et al. | |
| 4,923,829 A | 5/1990 | Yasutomi et al. | |
| 4,933,031 A | 6/1990 | Blomberg et al. | |
| 4,935,060 A | 6/1990 | Dingsoyr | |
| 5,007,480 A | 4/1991 | Anderssen | |
| 5,048,605 A | 9/1991 | Toon et al. | |
| 5,104,912 A | 4/1992 | Hoskin | |
| 5,106,423 A | 4/1992 | Clarke | |
| 5,125,456 A | 6/1992 | Hutchins et al. | |
| 5,195,588 A | 3/1993 | Dave | |
| 5,280,078 A | 1/1994 | Gregor et al. | |
| 5,349,118 A | 9/1994 | Davidovits | |
| 5,356,579 A | 10/1994 | Jennings et al. | |
| 5,382,371 A | 1/1995 | Stahl et al. | |
| 5,398,759 A | 3/1995 | Rodrigues et al. | |
| 5,539,140 A | 7/1996 | Davidovits | |
| 5,626,665 A | 3/1997 | Barger et al. | |
| 5,635,292 A | 6/1997 | Jennings et al. | |
| 5,637,412 A | 6/1997 | Jennings et al. | |
| 5,747,065 A | 5/1998 | Lee et al. | |
| 5,788,762 A | 8/1998 | Barger et al. | |
| RE32,742 E | 9/1998 | Skjeldal | |
| 5,891,364 A | 4/1999 | Incorvia, Jr. et al. | |
| 5,919,739 A | 7/1999 | Sunde et al. | |
| 5,979,557 A | 11/1999 | Card et al. | |
| 6,030,928 A | 2/2000 | Stahl et al. | |
| 6,071,436 A | 6/2000 | Incorvia | |
| 6,073,694 A | 6/2000 | Crawshaw | |
| 6,110,271 A | 8/2000 | Skaggs et al. | |
| 6,239,183 B1 | 5/2001 | Farmer et al. | |
| 6,284,714 B1 | 9/2001 | Bland et al. | |
| 6,312,515 B1 | 11/2001 | Barlet-Gouedard et al. | |
| 6,435,277 B1 | 8/2002 | Qu et al. | |
| 6,506,710 B1 | 1/2003 | Hoey et al. | |
| 6,613,720 B1 | 9/2003 | Feraud et al. | |
| 6,696,035 B2 | 2/2004 | Dastol et al. | |
| 6,703,352 B2 | 3/2004 | Dahayanake et al. | |
| 6,729,405 B2 | 5/2004 | DiLullo et al. | |
| 6,848,505 B2 | 2/2005 | Richard et al. | |
| 6,927,194 B2 | 8/2005 | Burts, III et al. | |
| 6,932,158 B2 | 8/2005 | Burts, III et al. | |
| 6,933,038 B2 | 8/2005 | Nanko et al. | |
| 6,939,833 B2 | 9/2005 | Burts, III et al. | |
| 6,997,261 B2 | 2/2006 | Burts, III et al. | |
| 7,013,973 B2 | 3/2006 | Danican et al. | |
| 7,060,661 B2 | 6/2006 | Dobson, Sr. et al. | |
| 7,111,683 B2 | 9/2006 | Nelson et al. | |
| 7,128,148 B2 | 10/2006 | Eoff et al. | |
| 7,303,018 B2 | 12/2007 | Cawiezel et al. | |
| 7,316,275 B2 | 1/2008 | Wang et al. | |
| 7,343,976 B2 | 3/2008 | Segura | |
| 7,393,407 B2 | 7/2008 | Dingsoyr et al. | |
| 7,470,419 B2 | 12/2008 | Hansen | |
| 7,510,009 B2 | 3/2009 | Cawiezel et al. | |
| 7,784,541 B2 | 8/2010 | Hartman et al. | |
| 7,789,146 B2 | 9/2010 | Panga et al. | |
| 2002/0040812 A1 | 4/2002 | Heying | |
| 2002/0157575 A1 | 10/2002 | DiLullo et al. | |
| 2004/0023815 A1 | 2/2004 | Burts, III et al. | |
| 2004/0194960 A1 | 10/2004 | DiLullo et al. | |
| 2005/0172864 A1 | 8/2005 | Dingsoyr et al. | |
| 2005/0230113 A1 | 10/2005 | Eoff et al. | |
| 2006/0030493 A1 | 2/2006 | Segura | |
| 2006/0084580 A1 * | 4/2006 | Santra et al. | 507/239 |
| 2006/0169455 A1 | 8/2006 | Everett et al. | |
| 2006/0211580 A1 | 9/2006 | Wang et al. | |
| 2006/0234871 A1 | 10/2006 | Dalrymple et al. | |
| 2006/0289158 A1 | 12/2006 | Reddy et al. | |
| 2007/0181039 A1 | 8/2007 | Yamamoto et al. | |
| 2007/0181042 A1 | 8/2007 | Masanaga et al. | |
| 2007/0254018 A1 | 11/2007 | Kuhns | |
| 2008/0003128 A1 | 1/2008 | Hansen | |
| 2008/0028994 A1 | 2/2008 | Barlet-Gouedard et al. | |
| 2008/0060811 A1 | 3/2008 | Bour et al. | |
| 2008/0108524 A1 | 5/2008 | Willberg et al. | |
| 2008/0178769 A1 | 7/2008 | Goodwin et al. | |
| 2008/0223596 A1 | 9/2008 | Ezell et al. | |
| 2010/0155371 A1 | 6/2010 | Gentsch | |
| 2010/0155372 A1 | 6/2010 | Battisti et al. | |
| 2010/0239644 A1 | 9/2010 | Feldstein et al. | |
| 2010/0243250 A1 | 9/2010 | Panga et al. | |
| 2010/0300688 A1 | 12/2010 | Panga et al. | |
| 2012/0132422 A1 | 5/2012 | Mirakyan et al. | |
| 2012/0138294 A1 | 6/2012 | Sullivan et al. | |
| 2013/0116156 A1 | 5/2013 | Lin et al. | |
| 2013/0319670 A1 | 12/2013 | Lin et al. | |
| 2014/0076563 A1 | 3/2014 | Lin et al. | |

FOREIGN PATENT DOCUMENTS

| | | |
|---|---|---|
| EP | 0711252 | 1/1998 |
| EP | 0659702 | 7/1998 |
| EP | 0866779 | 3/2000 |
| EP | 0521376 | 4/2000 |
| EP | 1653043 | 5/2006 |
| EP | 1725508 | 2/2008 |
| EP | 1887065 | 2/2008 |
| EP | 1534646 | 8/2008 |
| GB | 2056964 | 3/1981 |
| GB | 2179933 | 3/1987 |
| GB | 2212489 | 7/1989 |
| GB | 2216511 | 10/1989 |
| RU | 2133337 C1 | 7/1999 |
| RU | 2138629 C1 | 9/1999 |
| WO | 95/03995 | 2/1995 |
| WO | 97/20900 | 6/1997 |
| WO | 97/22564 | 6/1997 |
| WO | 98/01509 | 1/1998 |
| WO | 03/106368 | 12/2003 |
| WO | 2004016906 A1 | 2/2004 |
| WO | 2005/087684 | 9/2005 |
| WO | 2005/087685 | 9/2005 |
| WO | 2006/009455 | 1/2006 |
| WO | 2008/017414 | 2/2008 |
| WO | 2009/019471 | 2/2009 |
| WO | 2009/074658 | 6/2009 |
| WO | 2011/012921 | 2/2011 |

(56) References Cited

FOREIGN PATENT DOCUMENTS

| WO | 2011/012922 | 2/2011 |
|---|---|---|
| WO | 2012075154 A1 | 6/2012 |

OTHER PUBLICATIONS

C. Marca: "Remedial Cementing," in Nelson EB and Guillot D (eds.): Well Cementing—2nd Edition, Houston: Schlumberger (2006): 503-549.

Ikegami A and Imai N: "Precipitation of Polyelectrolytes by Salts," J. Polymer Science 1962, 56, 133-152.

Levitt DB. and Pope GA: "Selection and Screening of Polymers for Enhanced-Oil Recovery," paper SPE presented at the 2008 SPE/DOE Improved Oil Recovery Symposium held in Tulsa, OK Apr. 19-23, 2008. presented.

Schlumberger Publication FE_03_002_2, "CHDT Cased Hole Dynamics Tester," Jun. 2003.

H. A. Barnes, J. F. Hutton, and K. Walters, "An Introduction to Rheology," Elsevier, Amsterdam.

Chatterjee et al., "Study of copolymer-copolymer interactions and formation of intermacromolecular complexes", Journal of Polymer Science, vol. 22, Dec. 16, 1983, pp. 3697-3703.

Maltesh et al., "Effect of the degree of hydrolysis of polyacrylamide on its interactions with poly(ethylene oxide) and poly(vinylpyrrolidone)", Macromolecules, vol. 24, Feb. 11, 1991, pp. 5775-5778.

Gao, "Viscosity of partially hydrolyzed polyacrylamide under shearing and heat", Journal of Petroleum Exploration and Production Technology, vol. 3, 2013, pp. 203-206.

Ash et al., Handbook of Industrial Surfactants (4th Edition), Synapse Information Resources, Endicott, New York, 2005, 6 pages.

Daccord et al., "Cement-Formation Interactions", in Nelson E. and Guillot D. (eds.): Well Cementing—2nd Edition, Houston: Schlumberger (2006): pp. 202-219.

American Chemical Society, "Software estimates chemical, physical properties", Chemical & Engineering News, vol. 33(5), 1985, p. 27.

Umana et al., "Preparation of new membranes by complex formation of itaconic-acrylamide copoylymer with polyvinylpyrrolidone: studies on gelation mechanism by light scattering", J. Membr. Sci., vol. 157, Apr. 21, 1998, pp. 85-96.

Abshire et al., "Offshore Permanent Well Abandonment", Schlumberger Oilfield Review Magazine, Spring 2012, vol. 24, No. 1, pp. 42-50.

Borling et al., "Pushing Out the Oil with Conformance Control", Schlumberger Oilfield Review Magazine, Apr. 1994, vol. 6, No. 2, pp. 44-58.

International Search Report and Written Opinion issued in International Patent Application No. PCT/EP2013/060954 dated Aug. 26, 2013; 13 pages.

International Search Report and Written Opinion issued in International Patent Application No. PCT/US2011/062653 dated Mar. 9, 2012; 14 pages.

International Search Report and Written Opinion issued in International Patent Application No. PCT/US2011/062666 dated Mar. 9, 2012; 14 pages.

International Search Report and Written Opinion issued in International Patent Application No. PCT/US2013/060259 dated Feb. 18, 2014; 13 pages.

"Software estimates chemical, physical properties", Chemical & Engineering News, vol. 63(5), 1985, p. 27.

* cited by examiner

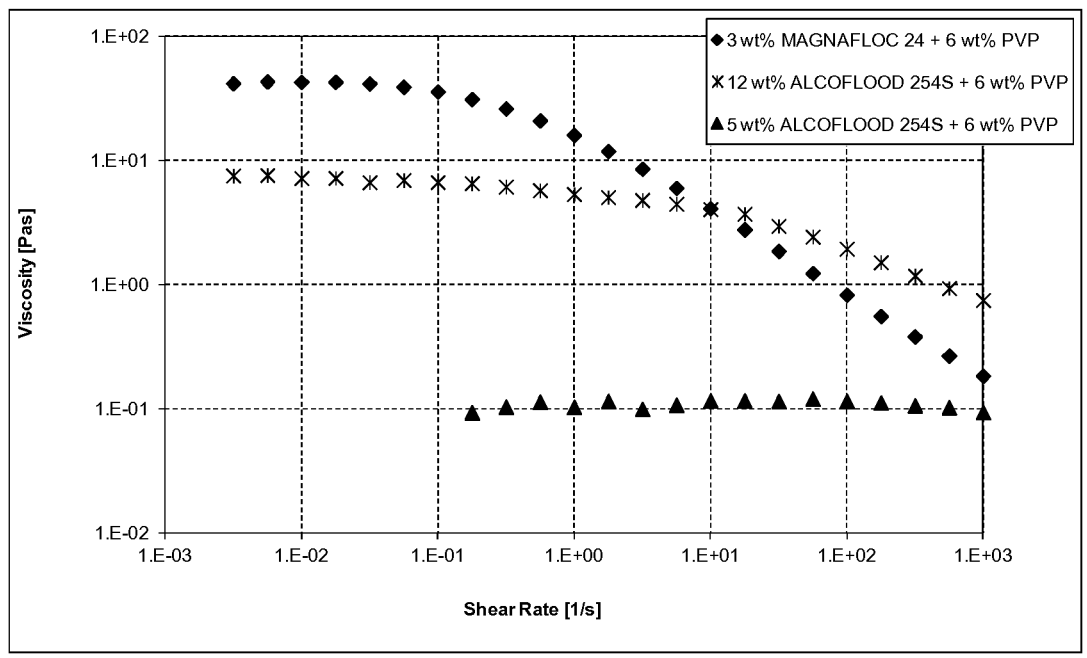

METHODS FOR SERVICING SUBTERRANEAN WELLS

CROSS REFERENCE TO RELATED APPLICATIONS

This application is a Continuation in Part of U.S. patent application Ser. No. 13/301,240 that was filed Nov. 21, 2011, which is hereby incorporated herein by reference in its entirety. This application also claims priority to and the benefit of Provisional Application U.S. 61/418,211, filed Nov. 30, 2010, which is hereby incorporated herein by reference in its entirety.

BACKGROUND

The statements in this section merely provide background information related to the present disclosure and may not constitute prior art.

This disclosure relates to methods for servicing subterranean wells, in particular, fluid compositions and methods for remedial operations during which the fluid compositions are pumped into a wellbore and make contact with well cements placed during primary cementing or previous remedial cementing operations.

During construction of a subterranean well, remedial operations may be required to maintain wellbore integrity during drilling, to cure drilling problems, or to repair defective primary cement jobs. Wellbore integrity may be compromised when drilling through mechanically weak formations, leading to hole enlargement. Cement slurries may be used to seal and consolidate the borehole walls. Remedial cementing is a common way to repair defective primary cement jobs, to either allow further drilling to proceed or to provide adequate zonal isolation for efficient well production.

During well production, remedial cementing operations may be performed to restore production, change production characteristics (e.g., to alter the gas/oil ratio or control water production), or repair corroded tubulars. During a stimulation treatment, the treatment fluids must enter the target zones and not leak behind the casing. If poor zonal isolation behind the production casing is suspected, a remedial cementing treatment may be necessary.

Well abandonment frequently involves placing cement plugs to ensure long-term zonal isolation between geological formations, replicating the previous natural barriers between zones. However, before a well can be abandoned, annular leaks must be sealed. Squeeze cementing techniques may be applied for this purpose.

Common cementitious-fluid systems employed during squeeze-cementing operations include Portland cement slurries, calcium-aluminate cement slurries, and organic resins based on epoxies or furans.

Portland cement slurries prepared from, for example, ISO/API Class H or Class G cement, are by far the most common cementitious fluids employed in remedial cementing operations. They perform satisfactorily in many applications; however, when the size of the void from which fluid leakage occurs is very small, the cement-particle size may be too large to enter and seal the void. This problem has been mitigated to a significant extent by grinding Portland cement clinker to a finer particle-size distribution. An example of a fine-particle-size, or microfine, Portland cement system is SqueezeCRETE™, available from Schlumberger. Generally, SqueezeCRETE systems are capable of sealing voids or cracks as small as about 100 micrometers.

SUMMARY

The present disclosure provides means to seal voids and cracks in or adjacent to a cement sheath in a subterranean well, and provide zonal isolation.

In an aspect, embodiments relate to methods for repairing a cemented wellbore penetrating a subterranean formation. An aqueous process fluid composition is prepared that comprises more than 1 wt % polyacrylamide and a non-metallic crosslinker. The composition is pumped into cracks in or voids adjacent to a set cement. The composition is then allowed to react with the set-cement surfaces and form a set product, thereby forming a seal.

In a further aspect, embodiments relate to methods for restoring zonal isolation in a cemented wellbore penetrating a subterranean formation. An aqueous process fluid composition is prepared that comprises more than 1 wt % polyacrylamide and a non-metallic crosslinker. The composition is pumped into cracks in or voids adjacent to a set cement. The composition is then allowed to react with the set-cement surfaces and form a set product, thereby forming a seal.

The disclosed compositions are advantageous in that they may be solids free, and may more freely enter voids, cracks or both in a cement sheath.

BRIEF DESCRIPTION OF THE DRAWINGS

FIG. 1 presents initial rheological data for three solutions containing polyacrylamide and polyvinylpyrrolidone.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and the detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood the Applicant appreciates and understands that any and all data points within the range are to be considered to have been specified, and that the Applicant possessed knowledge of the entire range and all points within the range.

The following definitions are provided in order to aid those skilled in the art to understand the detailed description.

The term "treatment," or "treating," refers to any subterranean operation that uses a fluid in conjunction with a desired function and/or for a desired purpose. The term "treatment," or "treating," does not imply any particular action by the fluid.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

As used herein, the term "process fluid" refers to a pumpable fluid that may be circulated in a subterranean well. Such fluids may include drilling fluids, cement slurries, spacer fluids, pills, chemical washes, completion fluids, fracturing fluids, gravel-pack fluids and acidizing fluids.

As used herein, the term "gel" refers to a solid or semi-solid, jelly-like composition that can have properties ranging from soft and weak to hard and tough. The term "gel" refers to a substantially dilute crosslinked system, which exhibits no flow when in the steady-state, which by weight is mostly liquid, yet behaves like a solid due to a three-dimensional crosslinked network within the liquid. It is the crosslinks within the fluid that give a gel its structure (hardness) and contribute to stickiness. Accordingly, gels are a dispersion of molecules of a liquid within a solid in which the solid is the continuous phase and the liquid is the discontinuous phase. A gel is considered to be present when the Elastic Modulus G' is larger than the Viscous Modulus G," when measured using an oscillatory shear rheometer (such as a Bohlin CVO 50) at a frequency of 1 Hz and at 20° C. The measurement of these moduli is well known to one of minimal skill in the art, and is described in *An Introduction to Rheology*, by H. A. Barnes, J. F. Hutton, and K. Walters, Elsevier, Amsterdam (1997).

The term polyacrylamide refers to pure polyacrylamide homopolymer or copolymer with near zero amount of acrylate groups, a polyacrylamide polymer or copolymer with a mixture of acrylate groups and acrylamide groups formed by hydrolysis and copolymers comprising acrylamide, acrylic acid, and/or other monomers.

This disclosure incorporates process fluids that may comprise more than 1 wt % polyacrylamide and a non-metallic crosslinker. The non-metallic crosslinkers do not include metals, but are instead organic molecules, oligomers, polymers, and/or the like. The polyacrylamide may have a weight average molecular weight higher than or equal to about 10,000 g/mol and lower than or equal to about 20 million g/mol, or between about 500,000 g/mol and about 5 million g/mol. The polyacrylamide may have a degree of hydrolysis of from 0% up to less than or equal to about 40%, or from 0.05% up to less than or equal to about 20%, or from 0.1% up to less than or equal to about 15%.

The non-metallic crosslinker may comprise a polylactam. Polylactams include any oligomer or polymer having pendent lactam (cyclic amide) functionality. Polylactams may be homopolymers, copolymers, block-copolymers, grafted polymers, or any combination thereof comprising from 3 to 20 carbon atoms in the lactam functional group pendent to the polymer backbone. Examples include polyalkyl-beta lactams, polyalkyl-gamma lactams, polyalkyl-delta lactams, polyalkyl-epsilon lactams, polyalkylene-beta lactams, polyalkylene-gamma lactams, polyalkylene-delta lactams, polyalkylene-epsilon lactams, and the like. Other examples of polylactams include polyalkylenepyrrolidones, polyalkylenecaprolactams, polymers comprising Vince lactam (2-azabicyclo[2.2.1]hept-5-en-3-one), decyl lactam, undecyl lactam, lauryl lactam, and the like. The alkyl or alkylene substituents in these polymers may include any polymerizable substituent having from 2 to about 20 carbon atoms, e.g., vinyl, allyl, piperylenyl, cyclopentadienyl, or the like. The non-metallic crosslinker may be polyvinylpyrrolidone, polyvinylcaprolactam, or a combination thereof. In the present disclosure, polyvinylpyrrolidone may have a weight average molecular weight higher than or equal to about 10,000 g/mol and less than or equal to about 2 million g/mol, or higher than or equal to 50,000 g/mol and less than or equal to about 2 million g/mol.

Once crosslinking occurs, the process fluid may become a gel.

The process fluid may have an initial pH between about 3 and about 9. Accordingly, the process fluid may further comprise a pH-adjusting agent. Such agents may comprise a base, an acid, a pH buffer, or any combination thereof. Such agents may comprise sodium hydroxide, sodium carbonate, sulfuric acid, an organic acid, carbon dioxide or a combination thereof.

The Applicant has determined that, when the disclosed polyacrylamide process fluids contact a set Portland cement surface, the fluids coagulate or form a gel. Such behavior is unusual in light of previous studies and practices involving polyacrylamide solutions for oilfield applications. During enhanced oil recovery and hydraulic fracturing operations, divalent cations are usually avoided (or controlled by adding chelating agents). For enhanced oil recovery, the presence of divalent cations may reduce the fluid's ability push hydrocarbons through the porosity of the producing formation. For hydraulic fracturing, polyacrylamide may be added to achieve friction reduction during fracturing-fluid placement. Contamination by divalent cations may reduce the friction pressure reduction effect. Set Portland cement contains roughly 20% calcium hydroxide when cured below 110° C. Without wishing to be held to any theory, the Applicant believes that diffusion of calcium hydroxide into the process fluid causes a gel to form. The resulting pH increase may also aid in the formation of the gel.

It will be appreciated that the disclosed polyacrylamide fluids may respond to other cements whose surfaces may provide means to raise the fluid pH, including lime/silica blends, lime/pozzolan blends, calcium aluminate cement, Sorel cement, chemically modified phosphate ceramics and geopolymers.

In an aspect, embodiments relate to methods for repairing a cemented wellbore penetrating a subterranean formation. An aqueous process fluid composition is prepared that comprises more than 1 wt % polyacrylamide and a non-metallic crosslinker. The composition is pumped into cracks in or voids adjacent to a set cement. The size of the voids and cracks may be smaller than about 100 μm. The sealant composition is allowed to react with the set-cement surfaces and form a set product, thereby forming a seal.

In a further aspect, embodiments relate to methods for restoring zonal isolation in a cemented wellbore penetrating a subterranean formation. An aqueous process fluid composition is prepared that comprises more than 1 wt % polyacrylamide and a non-metallic crosslinker. The composition is pumped into cracks in or voids adjacent to a set cement.

The sealant composition is allowed to react with the set-cement surfaces and form a set product, thereby forming a seal.

For all aspects, those skilled in the art will recognize that the set cement may be adjacent to the subterranean formation, or between two casing strings.

Those skilled in the art will also recognize that the process fluid may further comprise one or more viscosifiers. Some non-limiting examples of viscosifiers include (but are not limited to) hydratable gels (e.g. guars, poly-saccharides, xanthan, hydroxy-ethyl-cellulose, etc.), a crosslinked hydratable gel, a viscosified acid (e.g. gel-based), an emulsified acid (e.g. oil outer phase), an energized fluid (e.g. an $N_2$ or $CO_2$ based foam) and viscoelastic surfactants (VES). Additionally, the carrier fluid may be a brine, and/or may include a brine.

The VES may be selected from the group consisting of cationic, anionic, zwitterionic, amphoteric, nonionic and combinations thereof. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

A zwitterionic surfactant of the family of betaines may be used. Exemplary cationic viscoelastic surfactants include amine salts and quaternary ammonium salts. Exemplary amphoteric viscoelastic surfactant systems include for example amine oxides and amidoamine oxides. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide. Suitable anionic surfactants include alkyl sarcosinates.

The process fluid may optionally further comprise additional additives, including fluid loss control additives, gas migration control additives, colloidal-size minerals, corrosion inhibitors, scale inhibitors, catalysts, clay control agents, biocides, friction reducers, pH adjusting agents, pH buffers and combinations thereof and the like.

The placement method may incorporate a variety of remedial techniques known to those skilled in the art, and coiled tubing may be used to convey the process fluid into the well. Another placement method involves the Cased Hole Dynamics Tester (CHDT), available from Schlumberger, and described in U.S. Pat. No. 5,195,588 and *Schlumberger Publication FE_03_002_2, "CHDT Cased Hole Dynamics Tester,"* June 2003. The CHDT tool is normally used to extract formation-fluid samples from the subterranean well and also to perform pressure tests. Rather than using the CHDT for fluid extraction, the inventors envision the opposite—using the tool to inject the process fluids.

The placement method may also incorporate the use of pre- and post-flushes. For example, a high-pH (e.g., >9) or neutral-pH fluid may be pumped ahead of or behind the disclosed process fluids, or both. Such a technique may help prevent the process fluid from flowing too deeply into permeable formations, and confine the process fluid to the region where set cement exists.

EXAMPLES

The following examples serve to better illustrate the present disclosure. Three aqueous solutions of polyacrylamide and polyvinylpyrrolidone (PVP) were tested, and initial rheological data for these solutions are presented in FIG. 1.

Example 1

A sample of set Portland cement was broken into two pieces. One of the pieces was then further chipped to prepare two thin pieces.

A polymer solution was prepared with the following composition: 3 wt % MAGNAFLOC 24 polyacrylamide (MW=5 million, available from BASF) and 6 wt % polyvinylpyrrolidone (MW=55,000, available from Aldrich Chemical). The solution pH was 6.

In one experiment, the solution was laid on a cement surface. In a second experiment, the solution was placed in between a chipped thin cement piece and the remaining cement body. In both cases, the pH of the solutions rose to values between 11 and 12 within five minutes, and the initially flowable solutions turned into gels within about 20 minutes.

In the first experiment, the gel was strong enough to support the full weight of the cement piece. In the second experiment, the gel was strong enough to glue the cement pieces together. The results illustrate that contact with a cement surface will trigger the gelation of a polyacrylamide/polyvinylpyrrolidone solution. The pH rise apparently triggers the crosslinking of polyvinylpyrrolidone, leading to gelation.

Example 2

A sample of set Portland cement was broken into two pieces. One of the pieces was then further chipped to prepare two thin pieces.

Two polymer solutions were prepared. The first solution contained 5 wt % ALCOFLOOD 254S polyacrylamide (MW=500,000; available from BASF) and 6 wt % polyvinylpyrrolidone (MW=55,000, available from Aldrich Chemical). The second solution contained 12% ALCOFLOOD 254S polyacrylamide and 6 wt % polyvinylpyrrolidone (MW=55,000). The initial solutions pHs were 5.1 and 5.3, respectively.

The molecular weight of ALCOFLOOD 254S polyacrylamide is substantially lower than the MAGNAFLOC 24 described in Example 1. Longer gel times were observed when the solutions were placed on the cement surfaces. The first solution gelled within four hours, and the second solution gelled within one hour. Both gels were able to hold two cement pieces together.

Example 3

A sample of set Portland cement was broken into two pieces. One of the pieces was then further chipped to prepare two thin pieces.

A polymer solution was prepared with the following composition: 3 wt % non-ionic polyacrylamide (MW=5-6 million, available from Acros Organics through Thermo Fisher Scientific) and 6 wt % polyvinylpyrrolidone (MW=55,000, available from Aldrich Chemical). The initial solution pH was 5.6.

Within 5 minutes exposure to a cement surface, the solution pH had risen to 12. At the same time, the initially flowable solution turned into a gel that was strong enough to hold two cement pieces together.

Example 4

Experiments were performed to demonstrate that the gelling of polyacrylamide/polyvinylpyrrolidone solutions is selective.

A polymer solution was prepared with the following composition: 3 wt % MAGNAFLOC 24 polyacrylamide and 6% polyvinylpyrrolidone (MW=55,000).

The solution was applied to other mineral surfaces—sandstone, limestone and shale. None of these surfaces triggered gelation. After several hours exposure the solution pHs remained in the 6-7 range. The results show that the surface gelling on cement surfaces is unique due to the alkaline environment.

Although various embodiments have been described with respect to enabling disclosures, it is to be understood that the preceding information is not limited to the disclosed embodiments. Variations and modifications that would occur to one of skill in the art upon reading the specification are also within the scope of the disclosure, which is defined in the appended claims.

The invention claimed is:

1. A method for repairing a cemented wellbore penetrating a subterranean formation, comprising:
    i. preparing an aqueous process fluid composition comprising more than 1 wt % polyacrylamide and a non-metallic crosslinker, and having an initial pH between about 3 and about 9;
    ii. pumping the process fluid composition down the wellbore and into cracks in, or voids adjacent to a set cement sheath, thereby causing calcium hydroxide to diffuse from the set cement sheath into the process fluid composition, and the polyacrylamide therein to crosslink and form a set product; and
    iii. forming a seal.

2. The method of claim 1, wherein the non-metallic crosslinker comprises a polylactam.

3. The method of claim 1, wherein the non-metallic crosslinker comprises polyvinylpyrrolidone, polyvinylcaprolactam or a combination thereof.

4. The method of claim 3, wherein the polyvinylpyrrolidone has a weight average molecular weight of greater than or equal to about 50,000 g/mol and less than or equal to about 2 million g/mol.

5. The method of claim 1, wherein the non-metallic crosslinker has a weight average molecular weight greater than or equal to about 10,000 g/mol and less than or equal to about 2 million g/mol.

6. The method of claim 1, wherein the polyacrylamide has a degree of hydrolysis higher than or equal to about 0% and lower than or equal to about 40%.

7. The method of claim 1, wherein the molecular weight of the polyacrylamide is between about 10,000 g/mol and 20 million g/mol.

8. The method of claim 1, wherein the initial pH of the composition is between about 3 and about 9.

9. The method of claim 1, wherein the composition further comprises a pH-adjusting agent.

10. The method of claim 1, wherein the wellbore has been cemented with Portland cement, a lime/silica blend, a lime/pozzolan blend, calcium aluminate cementor a combination thereof.

11. A method for restoring zonal isolation in a cemented wellbore penetrating a subterranean formation, comprising:
    i. preparing an aqueous process fluid composition comprising more than 1 wt % polyacrylamide and a non-metallic crosslinker, and having an initial pH between about 3 and about 9;
    ii. pumping the process fluid composition down the wellbore and into cracks in, or voids adjacent to a set cement sheath, thereby causing calcium hydroxide to diffuse from the set cement sheath into the process fluid composition, and the polyacrylamide therein to crosslink and form a set product; and
    iii. forming a seal.

12. The method of claim 11, wherein the non-metallic crosslinker comprises a polylactam.

13. The method of claim 11, wherein the non-metallic crosslinker comprises polyvinylpyrrolidone, polyvinylcaprolactam or a combination thereof.

14. The method of claim 13, wherein the polyvinylpyrrolidone has a weight average molecular weight of greater than or equal to about 50,000 g/mol and less than or equal to about 2 million g/mol.

15. The method of claim 11, wherein the non-metallic crosslinker has a weight average molecular weight greater than or equal to about 10,000 g/mol and less than or equal to about 2 million g/mol.

16. The method of claim 11, wherein the polyacrylamide has a degree of hydrolysis higher than or equal to about 0% and lower than or equal to about 40%.

17. The method of claim 11, wherein the molecular weight of the polyacrylamide is between about 10,000 g/mol and 20 million g/mol.

18. The method of claim 11, wherein the initial pH of the composition is between about 3 and about 9.

19. The method of claim 11, wherein the composition further comprises a pH-adjusting agent.

20. The method of claim 11, wherein the wellbore has been cemented with Portland cement, a lime/silica blend, a lime/pozzolan blend, calcium aluminate cementor a combination thereof.

* * * * *